(12) United States Patent
Takihara et al.

(10) Patent No.: US 7,635,459 B2
(45) Date of Patent: Dec. 22, 2009

(54) METHOD OF REMOVING NITRIC ACID FROM AQUEOUS LIQUID AND METHOD OF PRODUCING DRINKS

(75) Inventors: Takanobu Takihara, Haibara-gun (JP); Yuji Kubota, Haibara-gun (JP)

(73) Assignee: ITO EN, Ltd., Tokyo (JP)

( * ) Notice: Subject to any disclaimer, the term of this patent is extended or adjusted under 35 U.S.C. 154(b) by 615 days.

(21) Appl. No.: 11/229,675

(22) Filed: Sep. 20, 2005

(65) Prior Publication Data
US 2006/0060537 A1    Mar. 23, 2006

(30) Foreign Application Priority Data
Sep. 21, 2004    (JP)    ............... 2004-273122

(51) Int. Cl.
C01B 21/00    (2006.01)

(52) U.S. Cl. ............... 423/394.2; 423/10; 423/387; 423/235; 423/395; 423/386; 210/656; 210/720; 210/638; 210/664; 210/198.2; 426/636; 426/271; 426/465; 426/489; 426/599

(58) Field of Classification Search ............... None
See application file for complete search history.

(56) References Cited

U.S. PATENT DOCUMENTS

| | | | |
|---|---|---|---|
| 4,097,420 A | | 6/1978 | Mikeš, et al. |
| 4,514,304 A | * | 4/1985 | Miyaki et al. ............... 210/638 |
| 5,407,696 A | * | 4/1995 | Hagiwara et al. ............ 426/636 |
| 6,482,305 B1 | * | 11/2002 | Mani ............ 204/534 |
| 2003/0189005 A1 | * | 10/2003 | Inoue et al. ............... 210/660 |

FOREIGN PATENT DOCUMENTS

| | | |
|---|---|---|
| EP | 0 501 708 A1 | 9/1992 |
| EP | 0 547 236 A1 | 6/1993 |
| FR | 2 260 588 | 9/1975 |
| JP | 52-142794 | 11/1977 |
| JP | 59-31678 | 2/1984 |
| JP | 5-7471 | 1/1993 |
| JP | 11-290041 | 10/1999 |
| JP | 2000-354475 | 12/2000 |
| JP | 2001-141710 | 5/2001 |
| JP | 2003-207493 | 7/2003 |
| JP | 2004-173552 | 6/2004 |

* cited by examiner

*Primary Examiner*—Melvin C Mayes
*Assistant Examiner*—Smita Patel
(74) *Attorney, Agent, or Firm*—Oblon, Spivak, McClelland, Maier & Neustadt, L.L.P.

(57) ABSTRACT

Disclosed is a method of removing nitric acid from an aqueous liquid containing various components such as vegetable extract, and nitrate ion is removed selectively without spoiling the taste or other components, by subjecting the aqueous liquid to chromatographic treatment with an amphoteric ion exchanger to separate nitrate ion from other components contained in the aqueous liquid. A nitric acid-reduced drink is produced by preparing a raw drink material comprising an extract or juice of plant tissue; removing nitric acid from the raw drink material with use of the method of removing nitric acid from an aqueous liquid as described above; and preparing a drink using the raw drink material after the removing of nitric acid.

11 Claims, 5 Drawing Sheets

METHOD OF REMOVING NITRIC ACID FROM AQUEOUS LIQUID AND METHOD OF PRODUCING DRINKS

BACKGROUND OF THE INVENTION

1. Field of the Invention

The present invention relates to a method of removing nitric acid from an aqueous solution that allows selective separation of nitrate ion from an aqueous solution containing multiple components including nitrate ion and a method of producing drinks by using the same. In particular, the invention relates to a method of removing nitric acid from an aqueous solution that is applicable to and allows selective removal of nitrate ion from aqueous solutions containing vegetable-derived components such as vegetable extract and enables convenient and cost-effective production of nitric acid-free drinks and a method of producing drinks by using the same.

2. Related Art

Commercially available packaged vegetable juices, which are produced from vegetable extracts or purees, are highly recognized as health drinks because of their nutritional value, and have been consumed by a greater number of people after tastier vegetable juices were made available by improvement in blending and others. Juices are advantageous in convenience in taking nourishment, but if the juices are contaminated with some harmful component, that component is also taken probably in a large amount.

Nitrate ion is a component that is feared to be possibly involved in production of carcinogenic substances such as nitrous acid and nitrosoamine in the body, and ingestion of nitrate ion is undesirable for health. Accordingly, there is a regulation on the nitrate concentration in potable water. Among garden stuff, vegetables also contain nitrate ion, and there are some countries setting, for example, an allowable limit or a target value. Vegetable juices are possibly contaminated with the nitrate ion originating from vegetables, and it became necessary to prevent the ingestion of nitrate ion in a large amount due to ingestion of vegetable juice. Thus, it has been discussed whether it is necessary to establish a provision restricting the nitrate ion concentration contained in the drinks produced from vegetable extracts and purees, and the methods of reducing the nitrate ion in drink production are now under development.

The methods for preventing the nitric acid ingestion from vegetable juice possibly include a method of reducing the nitric acid value in raw vegetable during cultivation and a method of removing the nitric acid present in the extract obtained from vegetable; but the method of removing nitric acid from extract is preferable from the point of reliability of operation independent of the distributional or other circumstances of vegetable, and thus, it is desirable to establish such a method.

Use of an anion-exchange resin has been known as the method of removing nitrate ion. For example, in Document 1 below, vegetable extracts are processed with an anion-exchange resin after an organic acid is added thereto for a counter ion and bound to the inorganic anions. Alternatively in Document 2 below, nitric acid is removed from a carrot juice by using a strongly basic anion-exchange resin. Also in Document 3 below, vegetable extracts are treated with a strongly basic anion-exchange resin, and the anion-exchange resin is regenerated with an aqueous sodium hydroxide solution and then washed with an aqueous sodium chloride solution.

Yet alternatively, in Document 4 below, chlorine and nitric acid are reduced by treating an extract of green leaf of a rice plant with an OH-type anion-exchange resin.

Document 1: Japanese Patent Application Laid-Open No. 2000-354475
Document 2: Japanese Patent Application Laid-Open No. 59-31678
Document 3: Japanese Patent Application Laid-Open No. 11-290041
Document 4: Japanese Patent Application Laid-Open No. 5-7471

However, the methods of Documents 1, 3 and 4 demand a counter ion and raise the processing cost. Although it is unclear, a counter ion seems to be needed also in Document 2, similarly to other literatures. Moreover, in the cases of Documents 2 to 4, the anions in the liquid are replaced with chlorine or the liquid is demineralized, resulting in change in taste, and thus, it becomes necessary to adjust the taste once again after the treatment. In addition, all the methods in the Documents demand regeneration of the ion-exchange resin, resulting in increase of running cost, complication of the entire operation, and limitation for the period allocated for removal of nitric acid.

BRIEF SUMMARY OF THE INVENTION

With the above problems in mind, it is therefore an object of the present invention to propose a method of removing nitric acid from an aqueous liquid that allows removal or reduction of nitrate ion present at a high concentration without a particular need for adding an additional component, while retaining the composition of the components other than nitrate ion as much as possible.

Another object of the present invention is to establish a method for removing nitrate ion selectively without spoiling the taste or other components, that is applicable to aqueous liquids containing various components such as vegetable extract.

Yet another object of the invention is to produce vegetable-derived drinks and potable water whose nitric acid concentration is reduced at lower cost in simpler steps without spoiling the taste by using the method of removing nitric acid ion selectively from an aqueous liquid above.

A method of removing nitric acid from an aqueous liquid, according to one aspect of the present invention, comprises: subjecting the aqueous liquid to chromatographic treatment with an amphoteric ion exchanger to separate nitrate ion from other components contained in the aqueous liquid.

According to another aspect of the present invention, a method of producing a drink, comprises: preparing a raw drink material comprising an extract or juice of plant tissue; removing nitric acid from the raw drink material with use of the method of removing nitric acid from an aqueous liquid as described above; and preparing a drink using the raw drink material after the removing of nitric acid.

By chromatographic treatment of an aqueous liquid such as vegetable extract or raw drink water with use of an amphoteric ion exchanger, it becomes possible to remove nitrate ion selectively, while recovering basically all ingredients including chloride ion eluted later than other components and discarding or removing nitrate ion eluted further later. Moreover, it becomes possible to reduce nitric acid while retaining the taste of the drink, by applying the method of the present invention to production of vegetable extracts or potable water. Because nitrate ion is eluted later, there is no need for a particular liquid for regenerating the exchanger resin, the operation is simpler and the running cost is lower. Therefore, the method of removing nitric acid is extremely useful in production and processing of drinks and foods using a vegetable juice or a plant extract as a raw material.

BRIEF DESCRIPTION OF THE DRAWINGS

The features and advantages of the removing method and the production method according to the present invention over the conventional art will be more clearly understood from the following description of the embodiments of the present invention and the accompanied drawings in which.

DETAILED DESCRIPTION OF THE INVENTION

Through intensive studies to solve the problems of the conventional art as described above, the inventors have found that it is possible to remove or reduce nitrate ion selectively by chromatographic treatment of an aqueous liquid by using an amphoteric ion exchanger, and the method of removing nitric acid according to the present invention has been accomplished.

Amphoteric ion exchangers are ion exchangers having both of a cation-exchange unit and an anion-exchange unit, and have predominantly a cation-exchange character at higher pH and an anion-exchange character at lower pH. And, their character at the boundary depends on the dissociation constants of said two ion-exchange units.

Typical examples of the conventional use of amphoteric ion exchanger for component separation include: removal of unreacted materials being included after chemical synthesis of a target component; recycle of electrolytes in the salt solutions recovered form demineralizer; and removal of undesirable components in the alkaline solutions recovered in pulp production. That is, use of amphoteric ion exchangers is aimed merely at removing contaminants present in concentration ranges predictable to some extent during component contamination, but there is no precedent example in which a particular component (e.g., nitrate ion) is removed from a mixture of many and unspecified inorganic and organic components such as vegetable extract.

In chromatography of an aqueous liquid by using an amphoteric ion exchanger as a stationary phase, it is known that a pair of cation and anion interacts with the stationary phase and chloride ion is eluted later than other anions, and that an acid is separated from a mixture of the acid and a salt of a pair of cation and anion. As for nitrate ion, it is known that nitric acid be separated from a mixed solution of nitric acid with iron nitrate or ammonium nitrate by delayed elution. However, according to the survey made by the inventors before filing the original Japanese paten application of the present application, it could not be known clear whether it was possible to further reduce the amount of nitrate ion or remove nitrate ion. In addition, it was also not clear whether it was possible to separate nitrate ion from a salt solution containing nitrate ion and chloride or organic acid ion.

In the present invention, the inventors have studied the separation bed for use in liquid chromatographic treatment of aqueous liquids containing various organic and inorganic components and it has been found that use of a separation bed containing an amphoteric ion exchanger is effective. Hereinafter, the liquid chromatography by using an amphoteric ion exchanger will be described in detail.

Examples of the cation-exchange unit in the amphoteric ion exchanger include carboxyl, iminodiacetic acid, sulfonic acid, phosphoric acid and phosphoric ester groups, and the like; examples of the anion-exchange unit include quaternary ammonium, tertiary amino, secondary amino, primary amino, polyethyleneimine, tertiary sulfonium and phosphonium groups, and the like; and examples of the groups containing both ion-exchange groups include amphoteric ion-exchange groups such as betaine, sulfobetaine and the like. Commonly available are weakly acidic-weakly basic type amphoteric ion exchangers having a weakly acidic cation-exchange unit (e.g., carboxyl group) and a weakly basic anion-exchange unit (e.g., amino group), and weakly acidic-strongly basic type amphoteric ion exchangers having a weakly acidic cation-exchange unit (e.g., carboxyl group) and a strongly basic anion-exchange unit (quaternary ammonium group). In the present invention, a weakly acidic-strongly basic type amphoteric ion exchangers are distinctively effective, and preferable are weakly acidic-strongly basic type amphoteric ion exchangers having a betaine-type amphoteric ion-exchange group represented by Formula: —$(CH_2)_m$—$N^+(R^1)(R^2)$—$(CH_2)_n$—$COO^-$ [wherein each of $R^1$ and $R^2$ represents an alkyl group having 1 to 3 carbons; and each of m and n is an integer of 1, 2, 3 or 4.]. These resins are known as betaine or snake-cage resins. Particularly preferable is a resin wherein each of $R^1$ and $R^2$ is a methyl group and each of m and n is 1. When used as a separation bed, the weakly acidic-strongly basic type amphoteric ion exchanger exhibits an ion-retarding action, making electrolytes eluted more slowly than non-electrolytes.

In the amphoteric ion exchangers, the ion-exchange groups are bound to a support body, and the support body may be in any shape, such as particle having a larger specific surface, fiber, or permeation membrane, similarly to common ion-exchange resins. The material for the support body is also not particularly limited and may be selected arbitrarily from various polymers including: styrene polymers such as polystyrene; polyolefins such as polyethylene and polypropylene; poly(halogenated olefin)s such as polyvinyl chloride; nitrile polymers such as polyacrylonitrile; acrylic polymers such as polymethyl methacrylate; styrene-divinylbenzene copolymers; vinylbenzyl chloride-divinylbenzene copolymers; and the like. The amphoteric ion exchanger can be prepared by: introducing the ion-exchange groups above onto the support by a common method in the polymerization process of the polymer precursors; and molding the resulting resin into a desirable shape. A commercially available amphoteric ion-exchange resin properly selected can also be used, and examples thereof include products manufactured by Mitsubishi Chemical Corp. (trade name: Diaion AMP01 and DSR01), a product manufactured by Dow Chemical Company (trade name: DOWEX Retardion 11A8), a product manufactured by Hokuetsu Carbon Industry Co., Ltd. (trade name: KS30), and the like.

The amphoteric ion-exchange resins can be classified into two types, i.e. betaine type and snake-cage type, both of which exhibit the ion-retarding action. They are utilized in the same way and there are no functional differences between them.

An example of the betaine type resin is Diaion AMP01 (trade name) manufactured by Mitsubishi Chemical Corp, and an example of the snake-cage type resin is DOWEX Retardion 11A8 (trade name) manufactured by Dow Chemical Company. In the former one, regular disposition and interaction are achieved by incorporating the cation-exchange unit and the anion-exchange unit into a single functional group. In the latter one, the interaction is achieved by disposing each individual ion-exchange group at equal intervals.

In the present invention, various aqueous salt solutions containing nitrate ion are passed through a separation bed of an amphoteric ion exchanger by using nitrate ion-free water, or practically ion-exchange water, as the mobile phase. Chloride and nitrate ions are eluted from the separation bed later than other components including organic acid ions, and the nitrate ion is eluted more slowly than the chloride ion. Accordingly, when a liquid to be treated, i.e., an aqueous liquid containing various components such as vegetable extract, and water are supplied continuously to the separation bed, nitrate ion is eluted later than other components; and thus, it is possible to separate nitrate ion from the ingredients in the liquid to be treated, by collecting fractions containing the components eluted prior to the nitrate ion, and to recover a solution selectively reduced in the nitric acid content without significantly affecting the amounts of components other than nitrate ion. Thus, it becomes possible to produce vegetable juices having a lower nitric acid value from the recovered liquid without spoiling the taste, and also various vegetable-derived processed foods containing a smaller amount of nitric acid.

In the chromatographic separation using a separation bed of the amphoteric ion exchanger as the stationary phase, separation of nitric acid from other components becomes more efficient, as the ratio (volume ratio) of the volume of the aqueous liquid treated at one time to that of the separation bed is decreased and the concentration of respective components in the aqueous liquid to be treated is lowered. Therefore, the concentration and the volume ratio of the aqueous liquid to be treated are adjusted appropriately, considering the concentration of nitrate ion in the treated aqueous liquid, the desired removal ratio of nitric acid, and the recovery ratio of other components. The volume of the aqueous liquid treated at one time is preferably 4 times the volume of the separation bed or less. If the volume of the aqueous liquid is larger than 4 times the volume of the separation layer, it leads to increased overlap of the nitrate ion and other components (in particular, chloride ion) in the eluted fractions, resulting in unfavorable separation. The volume of aqueous liquid is preferably twice the volume of the separation bed or less. The concentration (i.e. of nonvolatile matters) of the aqueous liquid is preferably adjusted to 0.3 g/ml or less.

The nitric acid removal method according to the present invention can be used not only in fixed bed systems such as column chromatography commonly practiced, but also in mobile bed systems and simulated mobile bed systems to perform the chromatographic separation continuously. In the present invention, nitrate ion is eluted later than other components and not immobilized on the separation bed by adsorption, which eliminates the need for an additional eluant for regeneration of the separation bed. Therefore, the method is easier to control operation and advantageous economically. Particularly when practiced in a simulated mobile bed system, the method according to the invention does not demand an additional eluant, making the structure of the facility simpler and also making it easier to adjust the timing of supplying the liquid to be treated, discharging nitrate ion, and recovering other components. Therefore, it is advantageous and used effectively in continuous treatment.

The nitric acid-removing method described above can be used for reduction or removal of nitrate ion without spoiling the original taste, as it is applied to various raw drink/food materials such as plant juice, plant extract, and raw water for mineral-containing drinks. An aqueous liquid of a raw drink/food material is adjusted as needed to a concentration suitable for chromatographic treatment; it is then subjected to the chromatographic treatment using an amphoteric ion exchanger as described above for removal of nitric acid; and the recovered liquid is further subjected as needed to concentration adjustment such as concentration or drying, cooking and seasoning, sterilization, and container encapsulation, before processed into a desirable drink or food.

EXAMPLES

Hereinafter, the present invention will be described more specifically with reference to Examples, but it should be understood that the present invention is not restricted by the following Examples.

Example 1

Figure 1:
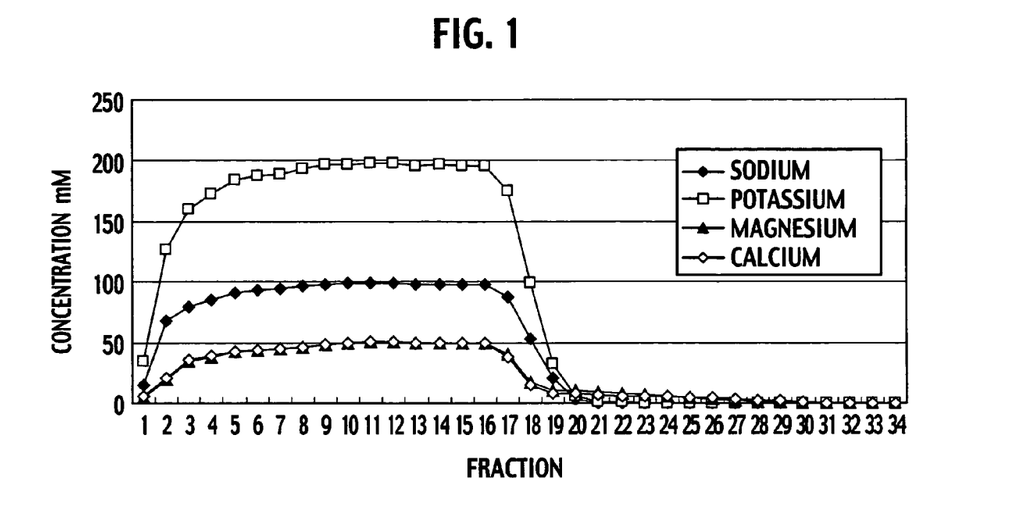
FIG. 1 is a graph showing the concentration of respective cations in the fractions obtained by chromatographic separation in Example 1.
Figure 2:
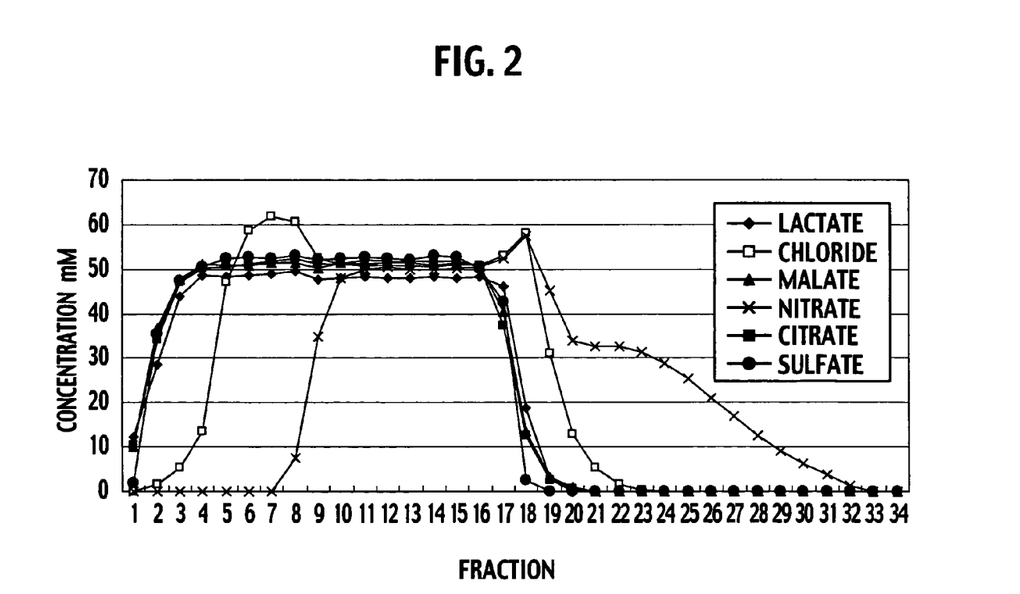
FIG. 2 is a graph showing the concentration of respective anions in the fractions obtained by the chromatographic separation in Example 1.

An aqueous liquid (pH: 6.8) containing various inorganic salts and organic acid salts at the concentrations shown in Table 1 was prepared. A 240 ml portion of the aqueous liquid was supplied at a volumetric flow rate of 4/hr downward to a column filled with 60 ml of an amphoteric ion-exchange resin (trade name: AMP-01, manufactured by Mitsubishi Chemical Corp.). Ion-exchange water was fed continuously after the application of the aqueous liquid. Examining the presence of the components of the aqueous liquid in the eluent from the column, the eluent containing the components of the aqueous liquid was fractioned into 15 ml aliquot parts from the start of elution, and the ions in each fraction was analyzed to investigate breakthrough of each ion. As for the breakthrough, if the concentration of an ion in a particular fraction was 10% or more of the concentration before treatment (i.e., the concentration in the aqueous liquid), it was judged that breakthrough of the ion occurred on that fraction. The analysis of the ions in each fraction was performed by ion chromatography using an electric conductometer under the following conditions. FIG. 1 shows the breakthrough of cations, and FIG. 2 shows the breakthrough of anions.

[Analytical conditions for cations]
Column: TSK gel IC-Cation I/II HR,
4.6 mm I.D.×10 cm
Guard column: TSK guard column IC-Cation I/II HR,
4.6 mm I.D.×5 mm
Mobile phase: 2 mM $HNO_3$
Flow rate: 0.8 ml/min
[Analytical conditions for anions]
Column: Shim-pack IC-A1, 4.6 mm I.D.×10 cm
Guard column: Shim-pack IC-GA1, 4.6 mm I.D.×1 cm Mobile phase: 1.2 mM potassium hydrogen phthalate/acetonitrile (95/5)

Flow rate: 1.5 ml/min

As shown in FIG. 1, among the cations, sodium and potassium ions break through the column already in fraction 1, and these ions are recovered in almost whole on or before fraction 19. Magnesium and calcium ions break through the column in fractions 1 to 24.

As shown in FIG. 2, among the anions, the organic acid ions first break through the column in fraction 1, and their elution is completed in fraction 18, while sulfate ion breaks through in fractions 1 to 17. Chloride ion breaks through later than those anions and is eluted in fractions 3 to 21. Nitrate ion is eluted further later, and its elution continues from fractions 8 until fraction 31.

To sum up the above results, the nitrate ion is eluted out of the column definitely later than other ions including chloride, and it is obvious from the results above that it is possible to separate nitrate ion from other ions by delayed elution when the aqueous liquid is supplied in an amount of 4 times the volume of the amphoteric ion-exchange resin.

Moreover, using the results of the method above, it is investigated whether it is possible to recover fractions so as to satisfy a recovery ratio of chloride ion at 80% or more and a nitrate ion-removal ratio of 50% or more, or not. As a result, it is found to be possible to satisfy the requirements described above by collecting fractions 1 to 16. The recovery ratios of respective ions after recovery of fractions 1 to 16 are summarized in Table 2.

After the recovery of fractions 1 to 16, the recovery ratio of nitric acid is 48.9%, while the recovery ratios of cations are all more than 85%. Each of organic acid ions and sulfate ion had a high recovery ratio of more than 90%. In contrast to the above, if collecting fractions up to 15, the nitrate ion-removal ratio increases but the chloride ion recovery ratio is reduced to less than 80%.

The results indicate that, in chromatographic separation using an amphoteric ion exchanger, it is possible to achieve selective removal of nitrate ion favorably by properly setting the fractions to be recovered.

Example 2

Figure 3:
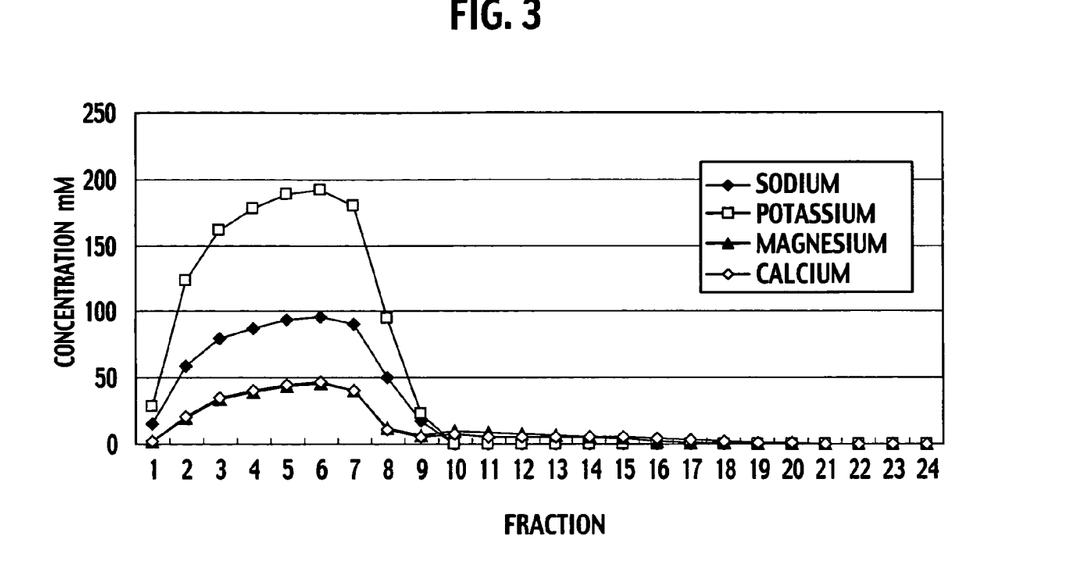
FIG. 3 is a graph showing the concentration of respective cations in the fractions obtained by chromatographic separation in Example 2.

A 90 ml portion of the aqueous liquid used in Example 1 was fed downward at a volumetric flow rate of 4/hr. into a column filled with 60 ml of an amphoteric ion-exchange resin (trade name: AMP-01, manufactured by Mitsubishi Chemical Corp.). Ion-exchange water was fed continuously after the application of the aqueous liquid. The eluent containing the components of the aqueous liquid was fractioned into 15 ml aliquot parts from the start of elution, while examining the presence of the components of the aqueous liquid in the eluent from the column, and breakthrough of each ion was investigated by analyzing the ions in each fraction. As for the breakthrough, if the concentration of an ion in a particular fraction was 10% or more of the concentration before treatment (i.e., the concentration in the aqueous liquid), it was judged that breakthrough of the ion occurred in that fraction. The analysis of the ions in each fraction was performed by ion chromatography using an electric conductometer under the same conditions as Example 1. FIG. 3 shows breakthrough of cations, and FIG. 4 shows breakthrough of anions.

As shown in FIG. 3, among cations, sodium and potassium ions break through the column already in fraction 1 and these ions are recovered in almost whole on or before fraction 19. Magnesium ion breaks through in fractions 2 to 14, while calcium ion breaks through in fraction 2 to 15.

Figure 4:
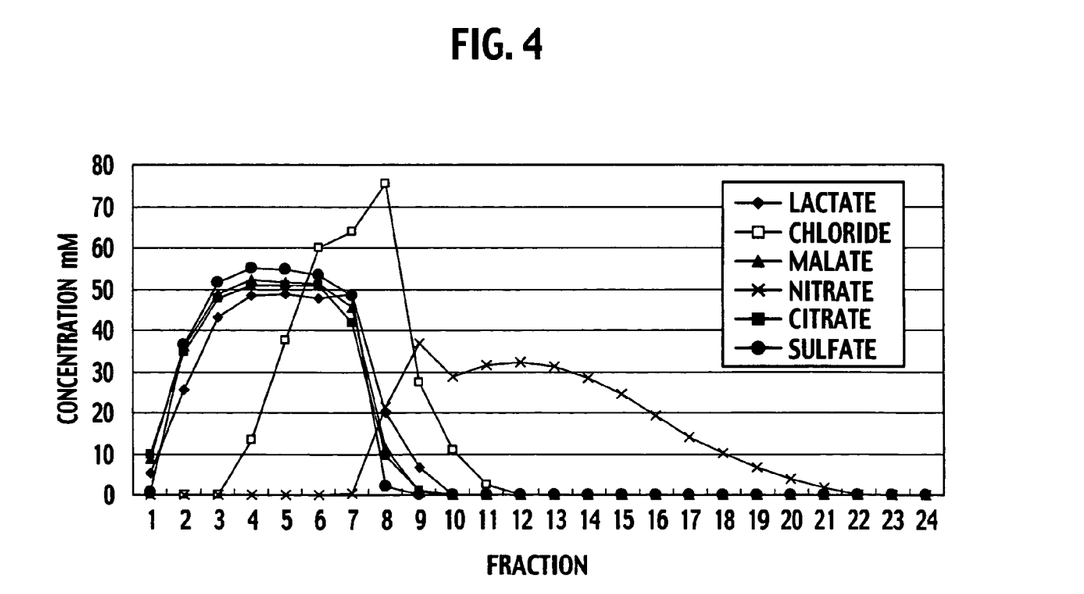
FIG. 4 is a graph showing the concentration of respective anions in the fractions obtained by the chromatographic separation in Example 2.

As shown in FIG. 4, among anions, the organic acid ions first break through the column in fraction 1 and the elution thereof is completed in fraction 8 or fraction 9. Sulfate ion is eluted in fractions 2 to 7. Chloride ion breaks through later than those anions and is eluted in fractions 4 to 10. Nitrate ion is eluted further later, and its elution continues from fraction 8 until fraction 19.

To sum up the above results, the nitrate ion is eluted obviously later than other ions including chloride from the column, and it is apparent from the results above that it is possible to separate nitrate ion from other ions by delayed elution when the aqueous liquid is supplied in an amount of 1.5 times the volume of the amphoteric ion-exchange resin.

TABLE 1

| Salt | Salt concentration mM | Concentration of ions in aqueous liquid mM | | | | | | | | | |
|---|---|---|---|---|---|---|---|---|---|---|---|
| | | Sodium | Potassium | Magnesium | Calcium | Chloride | Nitrate | Sulfate | Lactate | Malate | Citrate |
| Potassium nitrate | 50 | | 50 | | | | 50 | | | | |
| Disodium malate hemihydrate | 50 | 100 | | | | | | | | 50 | |
| Tripotassium citrate monohydrate | 50 | | 150 | | | | | | | | 50 |
| Magnesium sulfate (anhydrous) | 50 | | | 50 | | | | 50 | | | |
| Calcium chloride dihydrate | 25 | | | | 25 | 50 | | | | | |
| Calcium lactate | 25 | | | | 25 | | | | 50 | | |
| | Total | 100 | 200 | 50 | 50 | 50 | 50 | 50 | 50 | 50 | 50 |

TABLE 2

| Collected fractions | Recovery ratio of each ion % | | | | | | | | | |
|---|---|---|---|---|---|---|---|---|---|---|
| | Sodium | Potassium | Magnesium | Calcium | Lactate | Chloride | Malate | Nitrate | Citrate | Sulfate |
| 1-16 | 89.5 | 90.0 | 85.0 | 85.8 | 91.3 | 80.2 | 92.9 | 48.7 | 93.5 | 94.4 |

In addition, using the results of the method above, it is investigated whether it is possible to recover fractions so as to satisfy a recovery ratio of chloride ion at 80% or more and a nitrate ion-removal ratio of 50% or more, or not. As a result, it is found to be possible to satisfy the requirements described above by collecting from fraction 1 until one of fractions 8 to 11, as shown in Table 3. In all the cases, among the cations, sodium and potassium ions show a high recovery ratio of more than 95%, and magnesium and calcium ions also have a recovery ratio of more than 80%. The organic acid ions and sulfate ion show a high recovery ratio of either 100% or close to it. In contrast, a short recovery terminating at or before fraction 7 provides a decreased recovery ratio of chloride ion, while a long recovery extending to fraction 12 or more results in a nitric acid removal ratio of less than 50%.

As described above, in the chromatographic separation using an amphoteric ion exchanger, supply of the aqueous liquid in an amount less than four times the volume of the filled amphoteric ion-exchange resin results in improvement in the resolution of nitrate ion from other ions and thus gives flexibility in deciding the fractions to be recovered, allowing further improvement as needed in the removal ratio of nitrate ion and the recovery ratios of other components.

Figure 5:
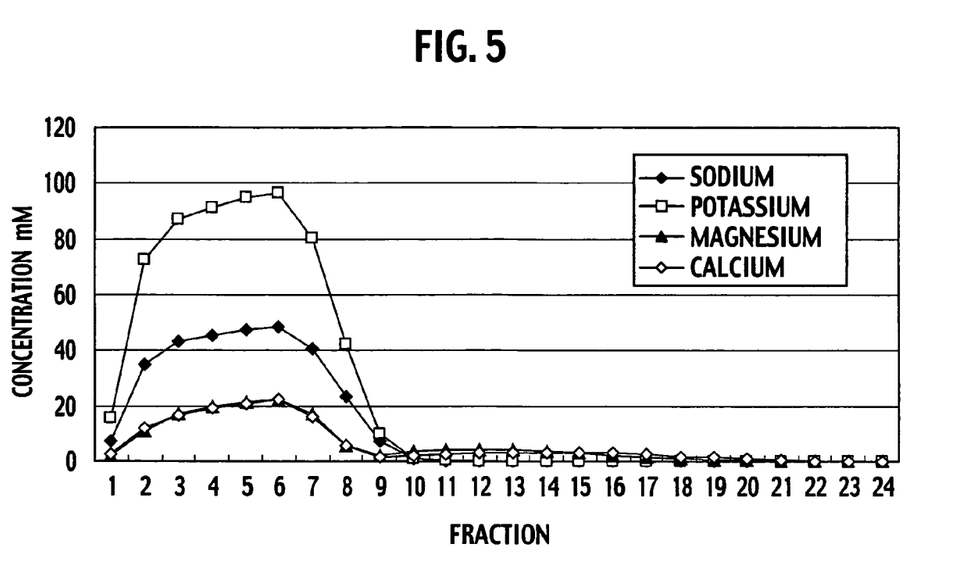
FIG. 5 is a graph showing the concentration of respective cations in the fractions obtained by chromatographic separation in Example 3.

As shown in FIG. 5, among cations, sodium and potassium ions break through the column already in fraction 1 and these ions are recovered in almost whole on or before fraction 19. Magnesium ion breaks through in fractions 2 to 15, while calcium ion breaks through in fractions 2 to 17.

Figure 6:
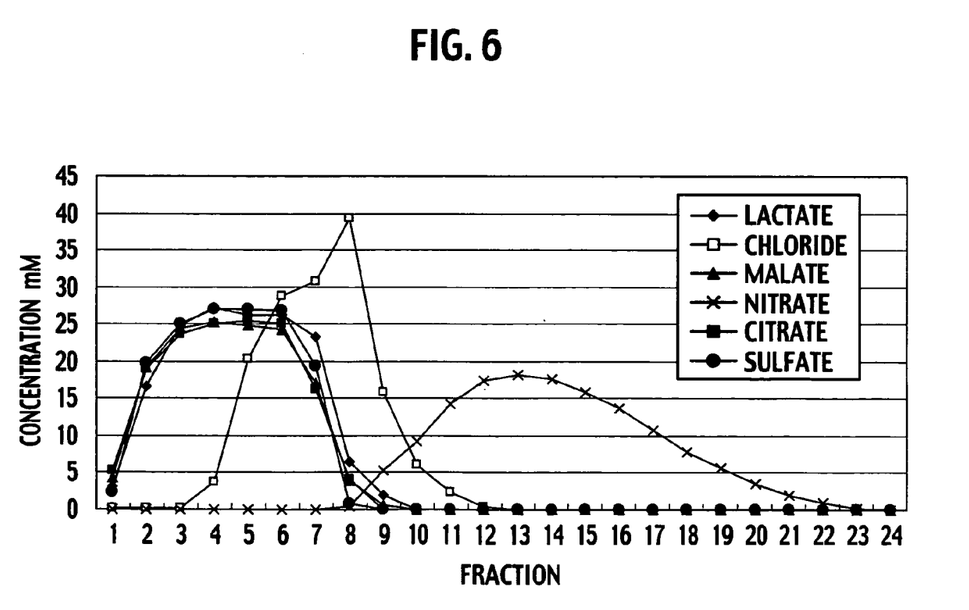
FIG. 6 is a graph showing the concentration of respective anions in the fractions obtained by the chromatographic separation in Example 3.

As shown in FIG. 6, among anions, the organic acid ions first broke through in fraction 1 and the elution thereof is completed in fraction 8. Sulfate ion is eluted in fractions 2 to 7. Chloride ion breaks through later than those anions and is eluted in fractions 4 to 10. Nitrate ion is eluted further later and its elution continues from fraction 9 until fraction 20.

To sum up, the nitrate ion is eluted obviously later than other ions including chloride from the column, and it is apparent from the results above that it is possible to separate the nitrate ion from other ions including chloride by delayed elution, when the aqueous liquid is supplied at a volume of 1.5 times the volume of the filled amphoteric ion-exchange resin.

In addition, it is investigated by using the method above whether it is possible to recover fractions so as to satisfy a recovery ratio of chloride ion at 80% or more and a nitrate ion-removal ratio of 50% or more, or not. As a result, it is

TABLE 3

| Collected fractions | Recovery ratio of each ion % | | | | | | | | | |
|---|---|---|---|---|---|---|---|---|---|---|
| | Sodium | Potassium | Magnesium | Calcium | Lactate | Chloride | Malate | Nitrate | Citrate | Sulfate |
| 1-8 | 96.9 | 98.0 | 81.4 | 82.1 | 97.7 | 86.1 | 99.8 | 7.4 | 99.7 | 100 |
| 1-9 | 99.9 | 99.9 | 83.8 | 84.0 | 100 | 95.5 | 100 | 20.0 | 100 | 100 |
| 1-10 | 100 | 100 | 87.1 | 86.5 | 100 | 99.2 | 100 | 30.0 | 100 | 100 |
| 1-11 | 100 | 100 | 89.9 | 88.5 | 100 | 100 | 100 | 40.8 | 100 | 100 |

Example 3

A 90 ml portion of a diluted aqueous liquid, which was obtained by diluting the aqueous liquid of Example 1 into twice the volume, was fed downward into a column filled with 60 ml of an amphoteric ion-exchange resin (trade name: AMP-01, manufactured by Mitsubishi Chemical Corp.) at a volumetric flow rate of 4/hr.

Ion-exchange water was fed continuously after the application of the diluted aqueous liquid, and the eluent containing the components of the aqueous liquid was fractioned into 15 ml aliquot parts from the start of elution by examining the presence of the components of the aqueous liquid in the eluent from the column, and breakthrough of each ion was investigated by analyzing the ions in each fraction. As for the breakthrough, if the concentration of an ion in a particular fraction was 10% or more of the concentration before treatment (i.e., concentration in the aqueous liquid), it was judged that breakthrough of the ion occurred in that fraction. The analysis of the ions in each fraction was performed by ion chromatography using an electric conductometer under the same conditions as Example 1. FIG. 5 shows breakthrough of cations, and FIG. 6 shows breakthrough of anions.

found to be possible to satisfy the requirements described above by collecting fractions from fraction 1 to one of factions 8 to 13, as shown in Table 4. In all the cases, among the cations, sodium and potassium ions show a high recovery ratio of more than 95%, while magnesium and calcium ions also show a recovery ratio of more than approximately 80%. The organic acid ions and sulfate ion show a high recovery ratio of 100% or close to it. In contrast, a short recovery terminating at or before fraction 7 results in decrease in the recovery ratio of chloride ion, while a long recovery extending to fraction 14 or more results in a nitric acid removal ratio of less than 50%.

As described above, in the chromatographic separation using an amphoteric ion exchanger, reduction in the concentration of the components in the aqueous liquid to be supplied results in improvement in the resolution of nitrate ion from other ions and thus gives flexibility in deciding the fractions to be recovered, allowing further improvement as needed in the removal ratio of nitrate ion and the recovery ratios of other components.

TABLE 4

| Collected fractions | Recovery ratio of each ion % | | | | | | | | | |
|---|---|---|---|---|---|---|---|---|---|---|
| | Sodium | Potassium | Magnesium | Calcium | Lactate | Chloride | Malate | Nitrate | Citrate | Sulfate |
| 1-8 | 97.3 | 98.1 | 79.6 | 80.1 | 98.8 | 83.3 | 99.6 | 0.2 | 100 | 100 |
| 1-9 | 99.7 | 99.8 | 81.0 | 81.3 | 100 | 94.0 | 100 | 3.9 | 100 | 100 |
| 1-10 | 100 | 100 | 83.4 | 82.9 | 100 | 98.1 | 100 | 10.3 | 100 | 100 |

TABLE 4-continued

| Collected | Recovery ratio of each ion % | | | | | | | | | |
|---|---|---|---|---|---|---|---|---|---|---|
| fractions | Sodium | Potassium | Magnesium | Calcium | Lactate | Chloride | Malate | Nitrate | Citrate | Sulfate |
| 1-11 | 100 | 100 | 86.3 | 84.7 | 100 | 99.6 | 100 | 20.4 | 100 | 100 |
| 1-12 | 100 | 100 | 89.2 | 86.8 | 100 | 99.9 | 100 | 32.6 | 100 | 100 |
| 1-13 | 100 | 100 | 92.0 | 88.8 | 100 | 100 | 100 | 45.3 | 100 | 100 |

Example 4

Figure 7:
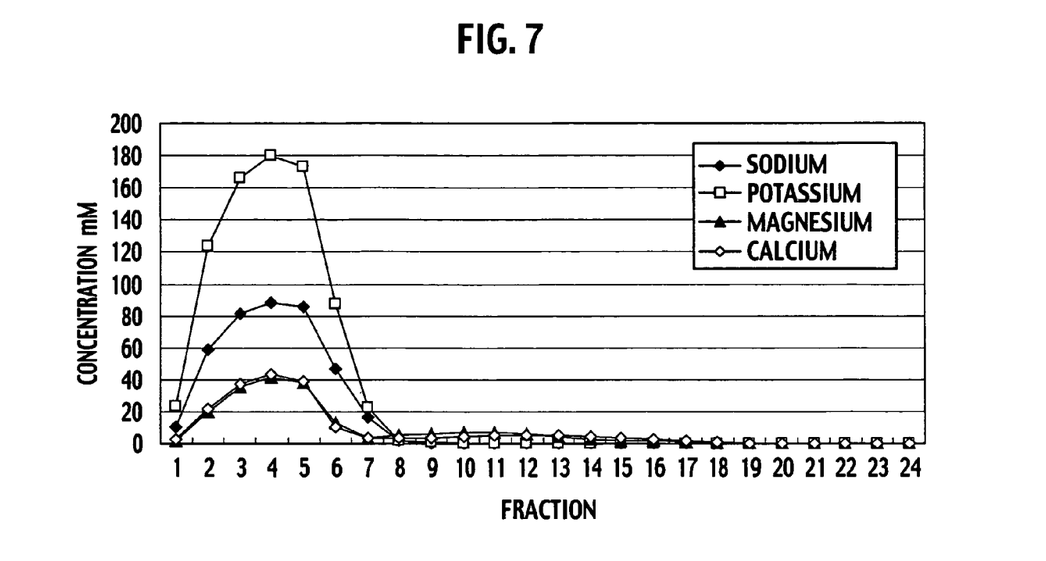
FIG. 7 is a graph showing the concentration of respective cations in the fractions obtained by chromatographic separation in Example 4.

A 60 ml portion of the aqueous liquid used in Example 1 was fed downward into a column filled with 60 ml of an amphoteric ion-exchange resin (trade name: AMP-01, manufactured by Mitsubishi Chemical Corp.) at a volumetric flow rate of 4/hr. Ion-exchange water was supplied continuously after the application of the aqueous liquid. The eluent containing the components of the aqueous liquid was fractioned into 15 ml aliquot parts from the start of elution by examining the presence of the components of the aqueous liquid in the eluent from the column, and breakthrough of each ion was investigated by analyzing the ions in each fraction. As for the breakthrough, if the concentration of an ion in a particular fraction was 10% or more of the concentration before treatment (i.e., the concentration in the aqueous liquid), it was judged that breakthrough of the ion occurred in that fraction. The analysis of the ions in each fraction was performed by ion chromatography using an electric conductometer under the same conditions as Example 1. FIG. 7 shows breakthrough of cations, and FIG. 8 shows breakthrough of anions.

As shown in FIG. 7, among the cations, sodium and potassium ions break through the column already in fraction 1 and these ions are recovered in almost whole on or before fraction 17. Magnesium and calcium ions break through in fractions 2 to 12.

Figure 8:
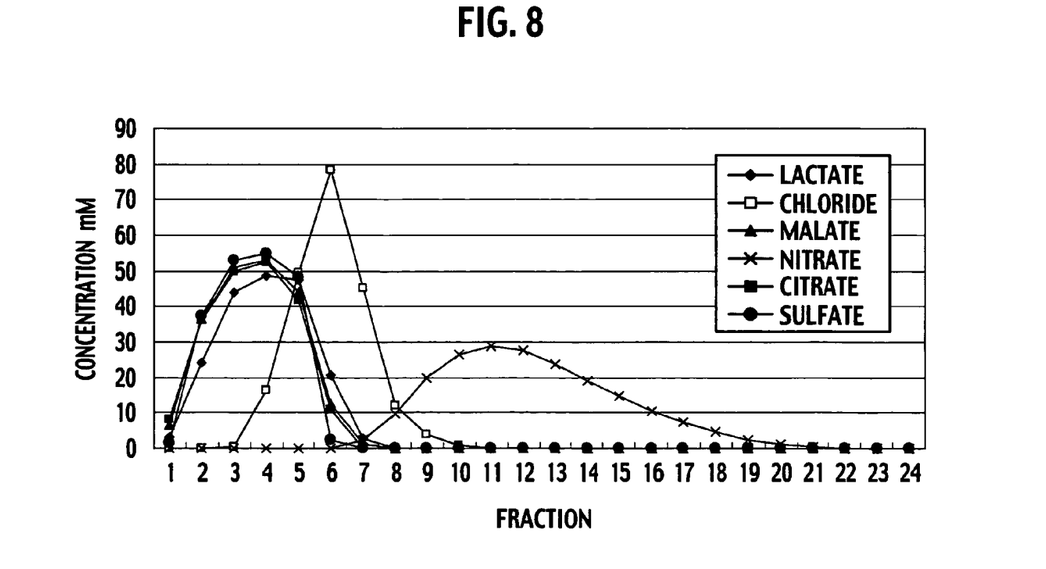
FIG. 8 is a graph showing the concentration of respective anions in the fractions obtained by the chromatographic separation in Example 4.

As shown in FIG. 8, among the anions, the organic acid ions first break through in fraction 1 and elution thereof is completed in fraction 6. Sulfate ion is eluted in fractions 2 to 5. Chloride ion breaks through later than those anions and is eluted in fractions 4 to 8. Nitrate ion is eluted further later and its elution continues from fraction 8 until fraction 17.

As shown above, the nitrate ion is eluted obviously later than other ions including chloride from the column, and it is apparent from the results above that it is possible to separate nitrate ion from other ions by delayed elution when the aqueous liquid is supplied in the same volume as that of the amphoteric ion-exchange resin.

In addition, it is investigated by using the method above whether it is possible to recover fractions so as to satisfy a recovery ratio of chloride ion at 80% or more and a nitrate ion-removal ratio of 50% or more, or not. As a result, it is found to be possible to satisfy the requirements described above by collecting from fraction 1 until one of fractions 7 to 11, as shown in Table 5. In all the cases, among the cations, sodium and potassium ions show a high recovery ratio of 100% or close to it, while magnesium and calcium ions also show a recovery ratio of more than approximately 80%. All of the organic acid ions and sulfate ion show a high recovery ratio of approximately 100%. In contrast, a short recovery terminating at or before fraction 6 results in decrease in the recovery ratio of chloride ion, while a long recovery extending to fraction 12 or more results in a nitric acid removal ratio of less than 50%.

As described above, in the chromatographic separation using an amphoteric ion exchanger, supply of the aqueous liquid at a volume of less than four times the volume of the filled amphoteric ion-exchange resin results in improvement in the resolution of nitrate ion from other components, and it is understood from the comparison with the results in Example 2 that decrease in the volume of the aqueous liquid supplied at one time is useful for improving the removal ratio of nitrate ion.

TABLE 5

| Collected | Recovery ratio of each ion % | | | | | | | | | |
|---|---|---|---|---|---|---|---|---|---|---|
| fractions | Sodium | Potassium | Magnesium | Calcium | Lactate | Chloride | Malate | Nitrate | Citrate | Sulfate |
| 1-7 | 99.6 | 99.7 | 78.5 | 79.5 | 100 | 92.0 | 100 | 1.2 | 100 | 100 |
| 1-8 | 99.9 | 99.9 | 81.1 | 81.2 | 100 | 97.8 | 100 | 6.0 | 100 | 100 |
| 1-9 | 100 | 100 | 84.3 | 83.1 | 100 | 99.6 | 100 | 16.0 | 100 | 100 |
| 1-10 | 100 | 100 | 87.9 | 85.4 | 100 | 100 | 100 | 29.3 | 100 | 100 |
| 1-11 | 100 | 100 | 91.3 | 88.0 | 100 | 100 | 100 | 43.8 | 100 | 100 |

Example 5

A 100 g portion of an aqueous 180 mM potassium nitrate solution was added to 500 g of a concentrated carrot juice (Brix: 36.6), to mix into a model sample of high-nitric acid carrot extract (Brix: 30.8). The concentrations of the various ions contained in the concentrated carrot juice and the model sample were analyzed by ion chromatography using an electric conductometer under the same analytical conditions as those in Example 1.

Figure 9:
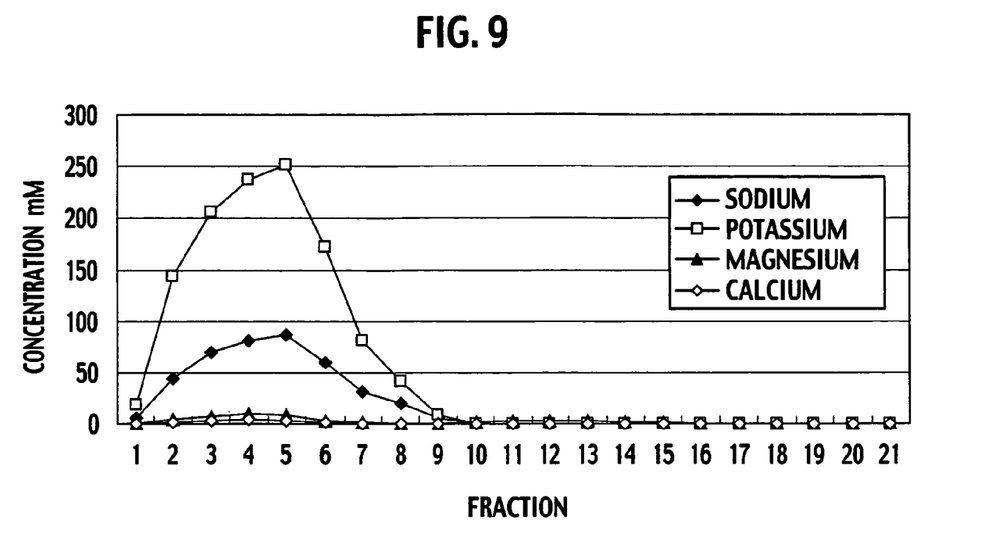
FIG. 9 is a graph showing the concentration of respective cations in the fractions obtained by chromatographic separation in Example 5.

A 90 ml portion of the model sample carrot extract was fed downward into a column filled with 60 ml of an amphoteric ion-exchange resin (trade name: AMP-01, manufactured by Mitsubishi Chemical Corp.) at a volumetric flow rate of 4/hr. Ion-exchange water was supplied continuously after the application of the model solution. The eluent containing the components of the carrot extract was fractioned into 15 ml aliquot parts from the start of elution by examining the presence of the components of the carrot extract in the eluent from the column, and breakthrough of each ion was investigated by analyzing the ions in each fraction. As for the breakthrough, if the concentration of an ion in a particular fraction was 10% or more of the concentration before treatment (i.e., the concentration in the model sample), it was judged that breakthrough of the ion occurred in that fraction. The analysis of the ions in each fraction was performed by ion chromatography using an electric conductometer under the same conditions as Example 1. FIG. 9 shows breakthrough of cations, and FIG. 10 shows breakthrough of anions.

As shown in FIG. 9, among the cations, sodium and potassium ions break through the column already in fraction 2 and almost all of these ions are recovered in almost whole on or before fraction 8. As for magnesium and calcium ions, breakthrough occurs separately at two stages in fractions 2 to 7 and fractions 9 to 15.

Figure 10:
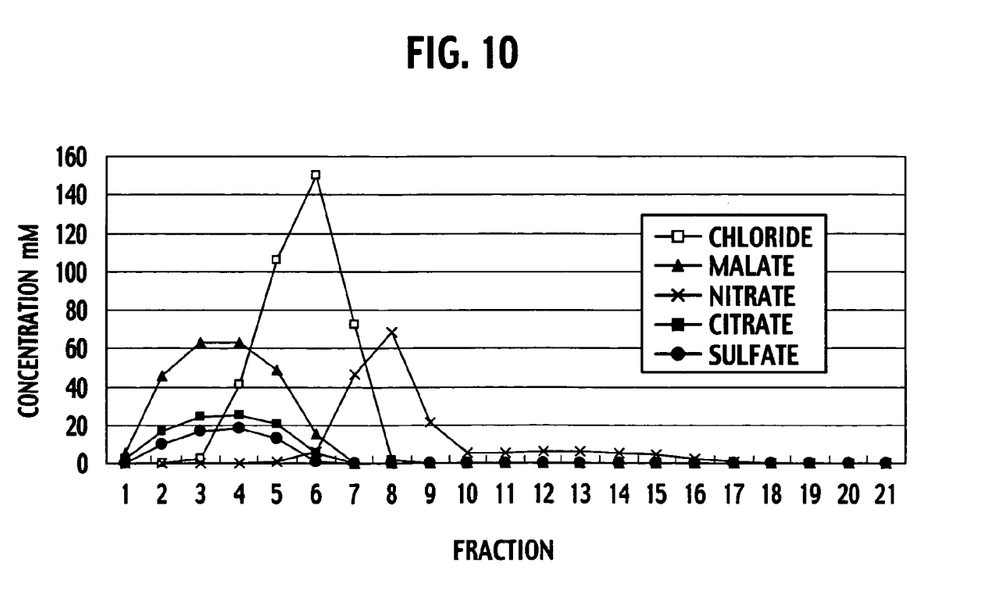
FIG. 10 is a graph showing the concentration of respective anions in the fractions obtained by the chromatographic separation in Example 5.

As shown in FIG. 10, among the anions, the organic acid ions and sulfate ion first break through in fraction 2 and the elution continues to fraction 6. Chloride ion breaks through slightly later than those anions and is eluted in fractions 3 to 7. Nitrate ion is eluted further later and its elution continues in a greater number of fractions, i.e., fractions 6 to 14 or later.

As described above, the nitrate ion is eluted obviously later than other ions including chloride from the column, and it is apparent from the above results that it is possible to separate nitrate ion from other ions by delayed elution when the carrot extract is fed in an amount of 1.5 times the volume of the amphoteric ion-exchange resin.

In addition, it is investigated by using the method above whether it is possible to recover fractions so as to satisfy a recovery ratio of chloride ion at 80% or more and a nitrate ion-removal ratio of 50% or more, or not. As a result, it is found to be possible to satisfy the requirements described above by collecting from fraction 1 until one of factions 6 to 7, as shown in Table 6. In all the cases, among the cations, sodium and potassium ions show a high recovery ratio of 85% or more, respectively, while each of magnesium and calcium ions also shows a recovery ratio of 65 to 80%. All the organic acid ions and sulfate ion show a high recovery ratio of approximately 100% or close to it. In contrast, a short recovery terminating at or before fraction 5 results in decrease in the recovery ratio of chloride ion, while a long recovery extending to fraction 8 or more results in a nitric acid removal ratio of less than 50%.

As described above, in the chromatographic separation using an amphoteric ion exchanger, it is possible to selectively separate nitrate ion practically from the carrot extract.

D (A: carrot concentrate, B: model sample, C: fractions 1 to 6, and D: fractions 1 to 7). In each sample, the organoleptic qualities thereof were evaluated and a combined estimate was given on the basis of the evaluation results concerning nitrate ion concentration above and organoleptic qualities. The sweetness and the body (fullness of flavor) of each evaluation sample in organoleptic qualities were rated by comparing the intensity of the evaluation sample with that of a diluted portion of the concentrated carrot juice as standard, and the results of organoleptic quality evaluation and combined estimate were grouped into three ranks: "Favorable", "Satisfactory", and "Unfavorable". Results are summarized in Table 7.

Since the Brix values of all samples subjected to the evaluation are previously adjusted by dilution, the apparent rates of decrease in the amounts of chloride and nitrate ions in evaluation samples C and D are different from those of the recovered solutions after chromatographic separation. Accordingly, in evaluation sample C, the apparent rate of decrease in the chloride ion amount is less than 10%, while the apparent rate of decrease in the amount of nitrate ion reaches as high as 95%. In evaluation sample D, the apparent rate of decrease in the chloride ion amount is only 1.5%, while the apparent rate of decrease in the nitrate ion amount exceeds 70%. Both evaluation samples C and D can be regarded as carrot juices from which nitrate ion is selectively removed.

As for the organoleptic qualities, the sweetness in each of the evaluation samples C and D is equivalent to that of the evaluation sample A. The body of the evaluation sample D is equivalent to that of the evaluation sample A, indicating that the sample has a favorable organoleptic quality as a carrot juice, while the evaluation sample C is lower in body, indicating that the sample is inferior to the evaluation sample A but still in the allowable range in organoleptic quality as a carrot juice.

The evaluation sample C is extremely lower in nitrate ion concentration and satisfactory in organoleptic qualities, and thus, for the combined estimate, the evaluation sample D, which is favorable both in nitrate ion concentration and organoleptic qualities, may be judged better.

The World Health Organization recommends an allowance for nitrate ion of 1,540 mg/person/week, which corresponds to a daily allowance of 220 mg/person/day, or about 3.5 mM/person/day. Assuming a daily vegetable juice consumption of 500 ml, the nitrate ion concentration in juice calculated

TABLE 6

| Collected fractions | Recovery ratio of each ion % | | | | | | | | |
| --- | --- | --- | --- | --- | --- | --- | --- | --- | --- |
| | Sodium | Potassium | Magnesium | Calcium | Chloride | Malate | Nitrate | Citrate | Sulfate |
| 1-6 | 85.6 | 88.7 | 68.5 | 76.8 | 80.1 | 99.9 | 3.7 | 100 | 100 |
| 1-7 | 93.4 | 95.7 | 72.8 | 79.9 | 99.3 | 100 | 29.6 | 100 | 100 |

The concentrated carrot juice and the model sample of high-nitric acid carrot extract used above as raw materials, a recovered liquid of fractions 1 to 6 eluted by the chromatographic separation described above, and a recovered liquid of fractions 1 to 7 were diluted respectively with ion-exchange water to adjust the Brix value to 6.0, and the resulting solutions were designated respectively as evaluation samples A to for reaching half of the allowance at the same consumption is 3.5 mM. Judging from the value as standard, the results shown in Table 7 seem to indicate that it is possible to produce juices having a favorable taste and containing nitrate ion at a concentration lower than the standard, from the recovered solutions obtained by chromatographic separation using an amphoteric ion exchanger of raw juice materials.

TABLE 7

| | | Evaluation sample A | Evaluation sample B | Evaluation sample C | Evaluation sample D |
|---|---|---|---|---|---|
| Amphoteric ion-exchange resin treatment | | No | No | Yes | Yes |
| Collected fractions | | — | — | 1-6 | 1-7 |
| Brix | | 6.0 | 6.0 | 6.0 | 6.0 |
| pH | | 6.43 | 6.43 | 6.65 | 6.55 |
| Chloride ion | Concentration mM | 15.4 | 15.4 | 14.4 | 15.2 |
| | Apparent rate of decrease % | — | — | 6.6 | 1.5 |
| Nitrate ion | Concentration mM | 2.6 | 8.5 | 0.4 | 2.2 |
| | Apparent rate of decrease % | — | — | 95.8 | 73.7 |
| Organoleptic qualities | Sweetness | (Standard) | Equivalent | Equivalent | Equivalent |
| | Body | (Standard) | Slightly stronger | Slightly weaker | Equivalent |
| | Evaluation | Favorable | Favorable | Satisfactory | Favorable |
| Combined estimate | | Favorable | Unfavorable | Satisfactory | Favorable |

It must be understood that the invention is in no way limited to the above embodiments and that many changes may be brought about therein without departing from the scope of the invention as defined by the appended claims.

What is claimed is:

1. A method for producing an aqueous liquid wherein the content of nitric acid is selectively reduced as compared to the other anions present in the aqueous liquid and wherein the composition of the other anions is substantially retained as compared to the corresponding untreated aqueous liquid, said method comprises:
    subjecting an aqueous liquid to chromatographic treatment with an amphoteric ion exchanger to separate nitrate ion selectively from other components contained in the aqueous liquid, said other components comprising at least one anion including chloride ion,
    eluting different fractions, and
    removing fractions containing the nitrate ions to provide and recover a resultant treated aqueous liquid having greater than equal to 80% chloride ions and less than or equal to 50% nitrate ions relative to the corresponding untreated aqueous liquid.

2. The method of claim 1, wherein the amphoteric ion exchanger includes a weakly acidic-strongly basic amphoteric ion exchanger having a weakly acidic cation-exchange unit and a strongly basic anion-exchange unit.

3. The method of claim 1, wherein the amphoteric ion exchanger has an amphoteric ion-exchange group represented by Formula: —$(CH_2)_m$—$N^+$ $(R^1)(R^2)$—$(CH_2)_n$—$COO^-$, wherein each of $R^1$ and $R^2$ represents an alkyl group having 1 to 3 carbons, and each of m and n is an integer of 1 to 4.

4. The method of claim 3, wherein each of the alkyl groups $R^1$ and $R^2$ is a methyl group, and each of the integers m and n is 1.

5. The method of claim 1, wherein the amphoteric ion exchanger comprises an amphoteric ion exchange resin mainly containing styrene-divinylbenzene copolymer.

6. The method of claim 1, wherein said other components contained in the aqueous liquid include: at least one inorganic cation; and said at least one anion is selected from the group consisting of inorganic anions and organic acid ions.

7. The method of claim 6, wherein said at least one inorganic cation is selected from the group consisting of sodium ion, potassium ion, magnesium ion and calcium ion, the inorganic anions include sulfate ion, and the organic acid ions include lactate ion, malate ion and citrate ion.

8. The method of claim 1, wherein the chromatographic treatment comprises a liquid chromatography treatment wherein water as a mobile phase is supplied to a separation bed comprising an amphoteric ion exchanger as a stationary phase.

9. The method of claim 1, wherein the chromatographic treatment comprises:
    passing the aqueous liquid through a separation bed comprising an amphoteric ion exchanger; and
    passing water through the separation bed continuously after the aqueous liquid,
    wherein the volume of the aqueous liquid passing through the separation bed is four times the volume of the separation bed, or less.

10. The method of claim 1, wherein the aqueous liquid comprises raw drink water or a raw drink material, the raw drink material comprising at least one of juice and extract of plant tissue.

11. A method of producing a drink, comprising:
    preparing a raw drink material comprising an extract or juice of plant tissue;
    selectively reducing nitric acid in the raw drink material by the method of claim 1; and
    preparing a drink using the raw drink material after selectively reducing nitric acid.

* * * * *